J. O. DODGE.
AUTOMATIC AIR BRAKE APPARATUS.
APPLICATION FILED OCT. 22, 1907.
925,566.
Patented June 22, 1909.
2 SHEETS—SHEET 1.
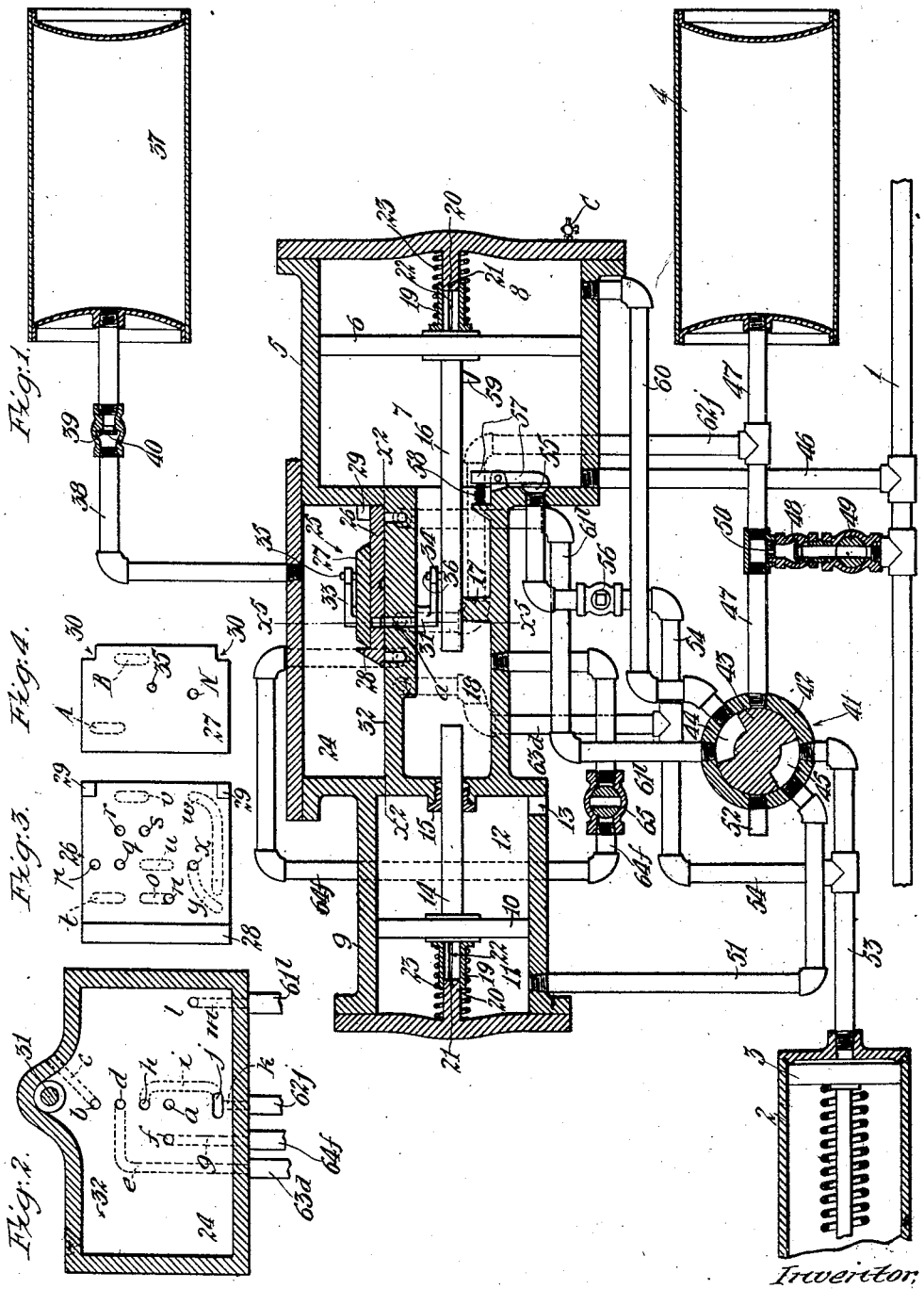
Witnesses:
Louis W. Gratz
Frank La Graham
Inventor,
James O. Dodge.
by Townsend & Hackley
his attys

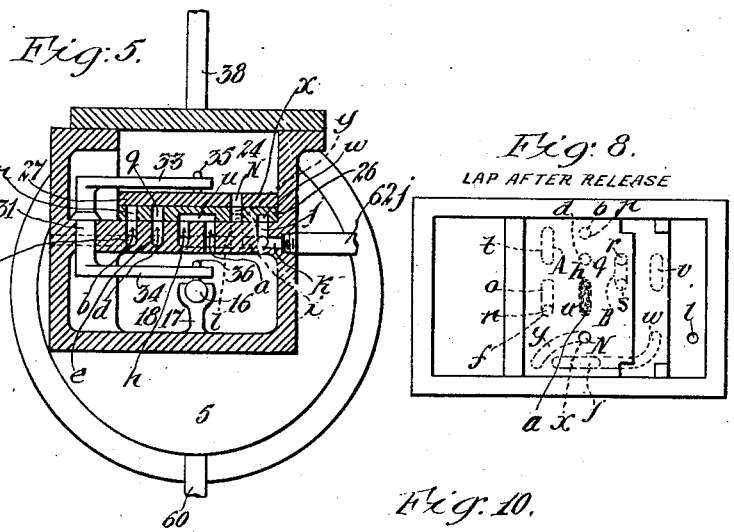

UNITED STATES PATENT OFFICE.

JAMES O. DODGE, OF LOS ANGELES, CALIFORNIA.

AUTOMATIC AIR-BRAKE APPARATUS.

No. 925,566.

Specification of Letters Patent.

Patented June 22, 1909.

Application filed October 22, 1907. Serial No. 398,663.

*To all whom it may concern:*

Be it known that I, JAMES O. DODGE, a citizen of the United States, residing at Los Angeles, in the county of Los Angeles and State of California, have invented a new and useful Automatic Air-Brake Apparatus, of which the following is a specification.

This invention relates to automatic air brake apparatus, and one object of the invention is to obviate a disadvantage in automatic air brakes now in common use wherein on a long and heavy grade, descending, reliance is placed on pressure retaining valves and hand brakes, both of which are manipulated by trainmen and are not under the control of the engineer, these retaining valves and hand brakes being necessary in the ordinary air brakes on account of the continued drain upon the auxiliary reservoir supply without the opportunity of renewal.

Another object is to avoid the difficulty of maintaining a uniform braking power on different cars wherein the efficiency of air brake depends on the length of piston travel and brake cylinder leakage, both of which will vary despite the utmost care.

Another object is to overcome the disadvantage due to impossibility of securing a uniform graduated release of the brakes wherein a partial release is effected by throwing the triple valve to release position, estimating the time required for the desired amount of air to escape and then returning the valves to service position and lap, which process is very uncertain in results both as to braking power and uniformity.

With my invention the brakes are placed wholly under the control of the engineer and he is enabled to supply air to the brake cylinders to compensate for leakage without the necessity of releasing brakes, or even reducing braking power on any car. A uniform brake cylinder pressure is also secured regardless of piston travel and all the flexibility of application and release is attained, that is the acknowledged advantage of straight air systems, at the same time retaining the prompt action which is the distinct advantage over the straight air system. Some of these results have been sought by others heretofore, but the apparatuses were not capable for use in long trains, or in trains wherein the brakes or engineer's valve were of the types in common use, both of which are essential in a practical apparatus.

With the present invention, starting with a definite normal train pipe pressure, a definite reduction in the train pipe pressure will produce a definite and known brake cylinder pressure in each car, which will be uniform regardless of piston travel, and so long as the train pipe pressure is held constant, the pressure in the brake cylinders will also remain constant and any ordinary leakage will be automatically supplied from the auxiliary reservoirs, which in turn are kept fed up to the train pipe pressure regardless of the position of the brakes and the auxiliary reservoir will always be charged to a pressure giving a safe margin for an automatic application in case of a broken train pipe.

In the present invention any definite gradual increase or decrease of train pipe pressure will result in a definite and known uniform decrease or increase in brake cylinder pressure within the range of braking power, regardless of piston travel. The apparatus can be used in trains of any length and may be readily adjusted for use with the engineer's valve of the common type, or with any number of brakes of the common type, and will assist and improve the action of brakes of other types.

The drawings are diagrammatical in form, and while pistons have been shown, it is obvious that simple or compound diaphragms of sufficient range of movement may be used in lieu thereof. Common slide valves have also been shown which may also be obviously modified in construction or arrangement of pistons, as desired, to produce the necessary connections as required in operation.

The accompanying drawings illustrate the invention, and referring thereto:—Figure 1 is a sectional view of the apparatus, the connecting pipes being in elevation, the parts being shown in running position. Fig. 2 is a horizontal section through the valve chamber on line $x^2-x^2$ Fig. 1. Fig. 3 is a plan view of the lower slide of the valve. Fig. 4 is a plan view of the upper slide of the valve. Fig. 5 is a section through the valve chamber on line $x^5-x^5$ Fig. 1. Fig. 6 is a plan view of the valve chamber, with cover removed, showing the position of the valve for "full release". Fig. 7 is a similar view showing position for "running". Fig. 8 is a similar view for "lap after release". Fig. 9 is a similar view for "service application". Fig. 10 is a similar view for "emergency application". Fig. 11 is a similar view for "lap after service application". Fig. 12 is a similar view for "graduated release".

In Figs. 6 to 12 inclusive, the ports and passages which are in communication have been stippled to graphically distinguish from the ports and passages not in communication, which latter are shown dotted.

1 designates the train pipe; 2 is the brake cylinder with piston 3; 4 is the auxiliary reservoir.

5 is what may be termed a first piston chamber in which is a piston 6, dividing the chamber into a first compartment 7 and a second compartment 8. A pet cock C is provided in a second compartment 8 for the purpose of relieving the pressure in the second compartment to release the brakes when a car is detached or when for other reasons the brakes on that car cannot be released by raising the train pipe pressure. A second piston chamber 9 is provided with piston 10 forming compartments 11 and 12, the latter compartment being in constant communication with the atmosphere through a port 13. Piston 10 is provided with a stem 14 which projects through a stuffing box 15. The piston 6 is provided with a stem 16 which is supported on a guide 17 located in an intermediate chamber 18 which is in constant communication with and forms an extension of the first compartment 7. A flanged sleeve 19 slides on a stud 20 in the second compartment 8, and a pin 21 engages a slot 22 in the sleeve and limits the movement of the sleeve to a definite point. A coil spring 23 is arranged behind the flanged sleeve 22 and has a length sufficient to move the sleeve 19 no farther to the left than shown in Fig. 1. The second piston 10 abuts against a similar spring supported flanged sleeve as shown. The two piston stems 14 and 16 are spaced apart as shown but are adapted to impinge in the operation to control the pistons as will be explained.

Above the chamber 18 is a valve chamber 24 in which is a valve 25 composed of a lower slide 26 and an upper slide 27. The lower slide 26 is provided with a flange 28 along one end as shown in Figs. 1 and 3, and on each opposite corner has lugs 29. The upper slide 27, as shown in Fig. 4, has two notched corners 30 which are adapted to abut the lugs 29 in operation. The upper slide is shorter than the lower slide and relative movement between the two slides is permitted which is limited by the flange 28 and lugs 29. A yoke having a shaft 31 is journaled in the lower wall 32 of valve chamber 24, and the shaft has two slotted arms 33 and 34, the former engaging a stud 35 on the upper slide, and the arm 34 engaging a stud 36 on the piston stem 16 whereby longitudinal movement of stem 16 imparts an equal amount of longitudinal movement to the upper slide 27.

A supplemental reservoir 37 is provided in each unit of apparatus and is connected with the valve chamber 24 by a pipe 38 in which is a check valve 39 the plunger of which has a small orifice 40 which gives constant communication between the supplemental reservoir and valve chamber, the orifice 40 allowing air to gradually feed into the supplemental reservoir when the pressure in the latter is lower than that in chamber 24, and the check valve 39 allowing air to freely flow out from the supplemental reservoir into chamber 24 when pressure in the latter is below that of the supplemental reservoir.

The lower wall 32 of valve chamber 24 has a port $a$ which extends clear through the wall. It also has a port $b$ which communicates with atmosphere through a passage $c$. The wall has a port $d$ which communicates with a passage $e$ extending to the side wall of the valve chamber. A port $f$ in the lower wall communicates through a passage $g$ with the side wall. A port $h$ communicates by a passage $i$ with an elongated port $j$, and a passage $k$ extends from port $j$ to the side wall of the valve chamber. A port $l$ communicates by a passage $m$ with the side wall. The port $a$ is the only port extending clear through the lower wall. All the other ports $b$, $d$, $f$, $h$, $j$ and $l$ extend down only to their associated passages.

The lower slide 26 has a port $n$ extending through it and has a passage $o$ on the under side of the slide. The lower slide also has ports $p$, $q$, $r$, and $s$ which extend clear through the slide. The lower slide also has on its under side passages $t$, $u$, $v$ and $w$. The lower slide also has a port $x$ extending clear through, with a passage $y$ on the lower side. The upper slide has a port N extending clear through and has two passages A and B on its lower side. A hand valve 41 is provided, comprising a casing 42 and a revoluble plug 43, the latter having two recesses 44 and 45.

A pipe 46 extends from the train pipe 1 to the first compartment 7. A pipe 47 extends from auxiliary reservoir 4 to the hand valve 41, and pipe 47 may have communication with the train pipe 1 through a check valve 48 and stop cock 49, a small orifice 50 being provided between check valve 48 and pipe 47 to restrict flow of air from train pipe 1 to pipe 47. A pipe 51 extends from hand valve 41 to compartment 11. A pipe 52 leads from hand valve 41 to the atmosphere. A pipe 53 leads from hand valve 41 to the brake cylinder 2. A pipe 54 leads from pipe 53 to a valve 55 in the first compartment 7 and a check valve 56 is arranged in valve 54. Valve 55 is operated by a lever 57 and held closed by a spring 58 except when the lever is tilted by a lug 59 on piston stem 16. A pipe 60 leads from second compartment 8 to the hand valve 41. A pipe 61¹ leads from hand valve 41 to passage m of port l. A pipe 62ʲ leads from pipe 47 to passage k of port j. A pipe 63ᵈ leads from pipe 54 to passage e of port d. A pipe 64ᶠ leads from chamber 18 to passage g of port f. A stop cock 65 is arranged in pipe 64ᶠ.

In the operation of the brake, assuming that all chambers, reservoirs, and compartments are at atmospheric pressure with the valve in the position shown in Fig. 7, air flows from the train pipe 1 through pipe 46 into first compartment 7 which forces piston 6 to the right and compresses spring 23. As the piston 6 thus moves to the right, the upper slide 27 is moved therewith a corresponding distance and valve 25 takes the position shown in Fig. 6. With the parts in this position port a registers with port n which is uncovered, and air flows through ports a and n into chamber 24 and through pipe 38 and through small orifice 40 in check valve 39 to the supplemental reservoir 37. At the same time the air flows through the passage o, which is associated with port n, and through port h, thence through passage i, which is associated with port h, to passage k and through pipe 62ʲ and pipe 47 to the auxiliary reservoir 4 and charges the auxiliary reservoir, the check valve 39 being constructed to allow charging of the supplemental reservoir 37 at about the same rate that the auxiliary reservoir 4 is charged. At the same time air also enters from the elongated port j into the passage w and from passage w enters port l which is in register therewith, and from port l enters passage m and from thence flows through pipe 61¹ to hand valve 41, entering recess 44 thereof, the hand valve 41 being in the position shown in Fig. 1. From recess 44 of valve 41 air flows through pipe 60 to second compartment 8 on the opposite side of piston 6. It will be observed that the brake cylinder 2 is open to the atmosphere through pipe 53, pipe 54, pipe 63ᵈ, passage e, port d, and passage t of the lower slide 28, and from passage t to port b, and thence through passage c to the atmosphere. With the valve 25 in this position, as shown in Fig. 6, the apparatus may be said to be in "full release position". With the parts in full release position, pressure builds up in chamber 8 until it reaches a point where, with the assistance of spring 23, it forces piston 6 to the left a distance equal to the extent of spring impelled movement of sleeve 19 and moves upper slide 27 of the valve therewith until the upper slide 27 strikes the flange 28, placing valve 25 in the position shown in Fig. 7, at which time the port n is shut off and port N is in register with port x. With this exception the previous connections of the first described position of the valve remain the same. With the valve in this position, as shown in Fig. 7, that is, with the slide 27 in contact with flange 28, air flows from train pipe through port h, passage i, through the left hand end of elongated port j to passage y, to port x, to port N, to supplemental reservoir; also from the right hand end of elongated port j to passage w, to port l, through passage m and pipe 61¹ to recess 44 of hand valve 41 and through pipe 60 to second compartment 8; air also flowing from elongated port j through passage k, to pipe 62ʲ, through pipe 47 to the auxiliary reservoir. This position of the valve (shown in Fig. 7) may be termed the "running position", and in this position with these connections, the pressures in the train pipe, auxiliary reservoir, supplemental reservoir, and second compartment will equalize.

When it is desired to make a service application of the brakes, a gradual reduction in the train pipe pressure is made, which will make a consequent reduction in first compartment 7, this causes the greater pressure in second compartment 8 to move piston 6 to the left, and as the upper slide 27 is already in contact with flange 28, both slides 26 and 27 are moved together to the left together with piston 6 until the stem 16 of piston 6 is in contact with stem 14 of piston 10, and piston 10 abuts its sleeve 19, the associated spring 23 not being compressed, and the valve is in what may be termed "service position" as shown in Fig. 9. The supplemental reservoir 37 has open communication with second compartment 8 through port l, passage m, pipe 61¹, recess 44 of hand valve 41 and pipe 60, and this communication exists until the valve 25 is restored to full release position again. At this time the auxiliary reservoir 4 has open communication with brake cylinder 2 through pipe 47, pipe 62ʲ, passage k, port j, and port j being closed by lower slide 26, air passes directly into passage i, through port h, through port s, to passage B, through port r to port d, through passage e and pipe 63ᵈ to pipe 54 and pipe 53 to brake cylinder 2, air also flowing through pipe 53 to recess 45 of hand valve 41, and through pipe 51 to compartment 11. Air now flows into the brake cylinder and into the compartment 11 until the pressure on piston 10 overcomes the opposing excess pressure in second compartment 8, whereupon the piston 10 through its stem 14 acting against stem 16 pushes back piston 6, both pistons 10 and 6 moving together to the right which carries the upper slide 27 to the right until its notched corners 30 strike abutments 29 of lower slide 26, at which time all ports of valve 25 are closed and the apparatus is in lap position, the valve 25 being in the position shown in Fig. 11. It will be seen that when in lap position the pressure in the brake cylinder will bear a known proportion to the reduction of train pipe pressure. A further reduction of train pipe pressure or leakage from the brake cylinder will again permit the pressure in chamber 8 to operate piston 6 and move the valve 25 to service position until the brake cylinder is supplied for a heavier application, or to compensate for leakage, after which the pressure in chamber 11 again restores the valve to lap position in the manner above described.

The valve being in lap position as shown in Fig. 11, and a graduated release being desired, a gradual increase of the train pipe pressure on piston 6 with the assistance of brake cylinder pressure on piston 10 will force both pistons 10 and 6 to the right until piston 6 strikes sleeve 19. During this movement the upper slide which at the beginning of movement was in contact with abutments 29 of the lower slide, causes both slides to be moved together to the right, and upon the piston 6 striking sleeve 19 the brake cylinder 2 and chamber 11 are open to the atmosphere by the following circuits, valve 25 now being in the position shown in Fig. 12, from chamber 11 through pipe 51 to recess 45 of hand valve 41, and through pipe 53 to pipe 54; from brake cylinder 53 to pipe 54 where it combines with air from the chamber 11, thence through pipe 63$^d$, through passage $e$, port $d$, port $q$, to passage A, to port $p$, to port $b$ and passage $c$ to atmosphere. When the pressure in the brake cylinder and chamber 11 has reduced sufficiently, the remaining excess in second compartment 8 will act against piston 6 to return the valve to lap position, upper slide covering ports $p$ and $q$, thus retaining a definite and known pressure in the brake cylinder.

When a full and immediate release of the brakes is desired, the train pipe pressure is suddenly raised sufficiently to cause piston 6 to compress spring 23, and the apparatus is thus placed in the position before described as full release position. The excess pressure in supplemental reservoir 37 will now open check valve 39 and air therefrom will quickly equalize into the train line which augments and accelerates the release wave through the train, after which the auxiliary reservoir and supplemental reservoir will again recharge. This feature is of considerable importance, inasmuch as in a long train an additional pressure is supplied to the train pipe from each unit, as each brake apparatus is provided with a supplemental reservoir 37. Without this reinforcing pressure from the supplemental reservoirs which are distributed along the train pipe, the pressure in the train pipe will not increase with the necessary rapidity as it progresses toward the rear of the train, and in a long train may not have sufficient force, but by reason of the successive pressure impulses added to the train pipe pressure from the several supplemental reservoirs the release wave in passing back through the train is augmented and accelerated so that it is perfectly effective throughout, even to the rear, in a long train.

To make an emergency application, a sudden reduction in train pipe pressure will cause the piston 6 to move to the left and carry with it the piston 10, causing an immediate compression of spring 23 in chamber 11. This movement of the pistons moves the valve 25 to a position shown in Fig. 10, where the large recess $v$ is brought into register with ports $h$ and $d$, thereby throwing the auxiliary reservoir and brake cylinder quickly into open communication permitting unrestricted flow of air to the brake cylinder. The pressure acting against spring 23 in chamber 11 as well as against the rising brake cylinder acting on piston 10, and the rapidly falling train pipe pressure in chamber 7, will insure the complete registration of ports $v$, $d$ and $h$ until release is effected by rise of train pipe pressure. It will be noted that spring 23 may expand without disturbing the relative position of the ports $v$, $d$ and $h$. At the same time the abutment 59 on stem 16 strikes lever 57 and opens valve 55 and admits air direct from train pipe and chamber 7 to brake cylinder through pipe 54, check valve 56 allowing flow of air in this direction but preventing its return from brake cylinder when pressure in the brake cylinder raises above train pipe.

With the foregoing operations it has been assumed that the apparatus is controlled by an engineer's valve which is adapted to provide a constant feed at variable pressures, and when such an engineer's valve is employed the stop cock 49 is kept open as shown. When this stop cock is open it provides for a constant feed through the check valve 48 to the auxiliary reservoir 4 when the pressure in the latter falls below that of the train line. This is intended to furnish air to compensate for brake cylinder leakage, but it would be manifestly objectionable unless provision is made for holding up train pipe pressure.

When an engineer's valve of the common type is employed which supplies no air to the train pipe when in lap position, during application of the brake, the stop cock 49 should be closed. In using this brake at the rear of a long train with other types of brakes, it would be difficult to raise the train pipe pressure rapidly enough to compress spring 23, and when this brake is so employed the stop cock 65 should be opened. Thus, when the valve passes to graduated release position, port $f$ registers with port $n$ which permits the supplemental reservoir and chamber 8 to equalize into the train line, thus producing full and immediate release.

It should be noted that leakage by the pistons 6 or 10 may occur. Leakage past piston 10 will be in effect the same as brake cylinder leakage, and may be disregarded unless sufficient to cause the brakes to release in an objectionably short time. Leakage past piston 6 will in time cause the brakes to fully release by equalizing pressure in chamber 8 and train pipe, but this may also be disregarded unless the leakage lowers the pressure at a greater proportional rate than the actual brake cylinder leakage. In case either of these leakages exists to an extent that renders the brake inoperative or unsafe, the hand valve 41 should be partially turned to close pipes 61¹ and 53 and to open communication between pipes 47 and 60, thereby placing compartment 8 in constant communication with auxiliary reservoir 4 and placing communication between pipe 51 and 52, thereby opening chamber 11 to the atmosphere. With the hand valve 41 in this position, the operation of the brake will be the same as that of what is commonly known as the Westinghouse type, with the exception that when at full release the excess pressure in the supplemental reservoir will equalize into the train pipe and assist the release wave and thus produce quicker release on the brakes irrespective of the type of brakes employed at the rear of the train.

What I claim is:—

1. In an automatic air brake system, a train pipe, a manual valve for controlling pressure in the train pipe, a piston chamber, a valve operating piston therein dividing it into a first compartment and a second compartment, the first compartment being in permanent communication with the train pipe, an auxiliary reservoir, a supplemental reservoir, a valve normally giving communication between the auxiliary reservoir and the second compartment, and a valve controlled by said valve operating piston for cutting off communication between the auxiliary reservoir and second compartment and opening communication between the supplemental reservoir and the second compartment.

2. In an automatic air brake system, in combination with the train pipe, an auxiliary reservoir, a supplemental reservoir, a piston chamber, a piston therein dividing it into first and second compartments, the first compartment being in constant communication with the train pipe, a valve controlled by said piston normally giving communication between the auxiliary reservoir and supplemental reservoir and between the auxiliary reservoir and second compartment, and for shutting off communication between the auxiliary reservoir and supplemental reservoir and between the auxiliary reservoir and second compartment, and opening communication between the supplemental reservoir and the second compartment upon reduction of train pipe pressure.

3. In an automatic air brake system, a train pipe, a supplemental reservoir, a piston having one side exposed to train pipe pressure and its other side to an equalizing pressure, a spring opposing final movement of the piston from train pipe pressure, a valve operated by the piston during its said final movement for opening communication between the supplemental reservoir and the train pipe, and a valve for opening communication between the supplemental reservoir and train pipe, and a stop cock for rendering the latter valve operative or inoperative.

4. In an automatic air brake system, a train pipe, a supplemental reservoir, a piston exposed to pressure from the train pipe, a spring opposing said piston for a portion of its movement from train pipe pressure, and a valve operated by said piston and adapted to open communication between the train pipe and supplemental reservoir upon compression of said spring.

5. In an automatic air brake system, a train pipe, a supplemental reservoir, a piston exposed to train pipe pressure, a spring opposing said piston for a portion of its movement from train pipe pressure, a valve operated by said piston opening communication between the train pipe and supplemental reservoir upon compression of said spring, permitting free flow of air from supplemental reservoir to train pipe, and a valve restricting said flow upon expansion of said spring.

6. In an automatic air brake system, a train pipe, a supplemental reservoir, means for automatically admitting air from the supplemental reservoir to the train pipe upon an increase of pressure in the train pipe, and a valve freely permitting said discharge from the supplemental reservoir but restricting inflow of air in charging the supplemental reservoir.

7. In an automatic air brake system, a train pipe, an auxiliary reservoir, a supplemental reservoir, a first piston chamber, a piston forming first and second compartments in said first piston chamber, a second piston chamber, a brake cylinder, connections between said reservoirs, compartments, second piston chamber and brake cylinder, and a hand controlled valve for closing communication between the second compartment and supplemental reservoir and opening constant communication between the second compartment and auxiliary reservoir and to close communication between the brake cylinder and second piston chamber and open the latter chamber to the atmosphere.

8. In an automatic air brake system, a train pipe, a brake cylinder, an auxiliary reservoir, a supplemental reservoir, a first piston chamber, a piston therein forming first and second compartments, a second piston chamber, a piston therein, stems on said pistons adapted to impinge and coact to control said pistons, a valve controlled by the first piston and having a plurality of positions, said valve when in full release position opening communication between the train pipe and the auxiliary reservoir, and between train pipe and supplemental reservoir, and between auxiliary reservoir and second compartment, and between brake cylinder and atmosphere.

9. In an automatic air brake system, a train pipe, a brake cylinder, an auxiliary reservoir, a supplemental reservoir, a first piston chamber, a piston therein forming first and second compartments, a second piston chamber, a piston therein, stems on said pistons adapted to impinge and coact to control said pistons, a valve controlled by the first piston and having a plurality of positions, said valve when in its running position opening communication between the train pipe and auxiliary reservoir, between the auxiliary reservoir and supplemental reservoir, between the auxiliary reservoir and second compartment, and between the brake cylinder and atmosphere.

10. In an automatic air brake system, a train pipe, a brake cylinder, an auxiliary reservoir, a supplemental reservoir, a first piston chamber, a piston therein forming first and second compartments, a second piston chamber, a piston therein, stems on said pistons adapted to impinge and coact to control said pistons, a valve controlled by the first piston and having a plurality of positions, said valve when in its lap after release position opening communication between the train pipe and auxiliary reservoir, and between supplemental reservoir and second compartment.

11. In an automatic air brake system, a train pipe, a brake cylinder, an auxiliary reservoir, a supplemental reservoir, a first piston chamber, a piston therein forming first and second compartments, a second piston chamber, a piston therein, stems on said pistons adapted to impinge and coact to control said pistons, a valve controlled by the first piston and having a plurality of positions, said valve when in its service position or its emergency application position opening communication between the auxiliary reservoir and brake cylinder, and between supplemental reservoir and second compartment.

12. In an automatic air brake system, a train pipe, a brake cylinder, an auxiliary reservoir, a supplemental reservoir, a first piston chamber, a piston therein forming first and second compartments, a second piston chamber, a piston therein, stems on said pistons adapted to impinge and coact to control said pistons, a valve controlled by the first piston and having a plurality of positions, said valve when in its emergency position opening communication between train pipe and brake cylinder, between auxiliary reservoir and brake cylinder, and between supplemental reservoir and second compartment.

13. In an automatic air brake system, a train pipe, a brake cylinder, an auxiliary reservoir, a supplemental reservoir, a first piston chamber, a piston therein forming first and second compartments, a second piston chamber, a piston therein, stems on said pistons adapted to impinge and coact to control said pistons, a valve controlled by the first piston and having a plurality of positions, said valve when in a transitory position between emergency position and lap opening communication between auxiliary reservoir and brake cylinder, and between supplemental reservoir and second compartment.

14. In an automatic air brake system, a train pipe, a brake cylinder, an auxiliary reservoir, a supplemental reservoir, a first piston chamber, a piston therein forming first and second compartments, a second piston chamber, a piston therein, stems on said pistons adapted to impinge and coact to control said pistons, a valve controlled by the first piston and having a plurality of positions, said valve when in its lap after application position opening communication between the supplemental reservoir and second compartment.

15. In an automatic air brake system, a train pipe, a brake cylinder, an auxiliary reservoir, a supplemental reservoir, a first piston chamber, a piston therein forming first and second compartments, a second piston chamber, a piston therein, stems on said pistons adapted to impinge and coact to control said pistons, a valve controlled by the first piston and having a plurality of positions, said valve when in its graduated release position opening communication between train pipe and auxiliary reservoir, opening communication between supplemental reservoir and second compartment, and between brake cylinder and atmosphere.

16. In an automatic air brake system, a train pipe, a brake cylinder, an auxiliary reservoir, a supplemental reservoir, a first piston chamber, a piston therein forming first and second compartments, a second piston chamber, a piston therein, stems on said pistons adapted to impinge and coact to control said pistons, a valve controlled by the first piston and having a plurality of positions, said valve when in its graduated release position opening communication between train pipe and auxiliary reservoir, opening communication between supplemental reservoir and second compartment, and between brake cylinder and atmosphere, and a stop cock which when open acts in conjunction with said valve to open communication between the train pipe and supplemental reservoir, to secure full release.

17. In an automatic air brake system, a train pipe, a supplemental reservoir, a brake cylinder, a valve for automatically controlling the pressure in the brake cylinder, a piston subjected on one side to train pipe pressure for operating said valve, a second piston subjected to brake cylinder pressure for impelling the first piston to assist the train pipe pressure, the first piston being impelled in the other direction by air pressure, from the supplemental reservoir which pressure is controlled by said valve.

18. In an automatic air brake system, a train pipe, a supplemental reservoir, a brake cylinder, a valve for automatically controlling the pressure in the brake cylinder, a piston for operating said valve and subjected on one side to the train pipe pressure and subjected on the other side to a valve controlled pressure from the supplemental reservoir which pressure is controlled by said valve.

19. In an automatic air brake system, a train pipe, a brake cylinder, a supplemental reservoir, a valve adapted to open communication between the brake cylinder and the atmosphere upon an increase of train pipe pressure, and a valve adapted to open communication between the supplemental reservoir and the train pipe upon a further increase of train pipe pressure.

20. In an automatic air brake system, an auxiliary reservoir, a piston chamber, a piston therein normally subjected on one side to auxiliary reservoir pressure and subjected on the other side to an opposing pressure, a valve operated by said piston adapted to close communication between the auxiliary reservoir and said piston chamber and a hand controlled valve opening constant communication between the auxiliary reservoir and said piston chamber.

21. In an automatic air brake system, a brake cylinder, a piston chamber, a valve operating piston therein, a second piston chamber, a second piston therein adapted to coact with the first piston to control valves, means of communication between the second piston chamber and the brake cylinder, and a hand controlled valve adapted to constantly close said communication.

22. In an automatic air brake system, a train pipe, a supplemental reservoir, a piston chamber, a piston therein subjected to permanent train pipe pressure on one side, and a valve operated by said piston which in service application position, in emergency application position, or in lap position, is adapted to open communication between the supplemental reservoir and said piston chamber on the opposite side of the piston.

23. In an automatic air brake system, a train pipe, a supplemental reservoir, a piston subjected on one side to train pipe pressure, a valve operated by said piston adapted to open communication between the train pipe and the supplemental reservoir, and a hand valve for closing said communication constantly.

In testimony whereof, I have hereunto set my hand at Los Angeles, California, this 15th day of October 1907.

JAMES O. DODGE.

In presence of—
GEORGE T. HACKLEY,
FRANK L. A. GRAHAM.